D. BEGIER.
SPRING TRAP.
APPLICATION FILED MAR. 28, 1911.

1,006,048.

Patented Oct. 17, 1911.

Witnesses

Inventor
D. Begier.

By _____, Attorneys.

UNITED STATES PATENT OFFICE.

DETLEV BEGIER, OF CHEYENNE, OKLAHOMA.

SPRING-TRAP.

1,006,048.  Specification of Letters Patent.  Patented Oct. 17, 1911.

Application filed March 28, 1911. Serial No. 617,392.

*To all whom it may concern:*

Be it known that I, DETLEV BEGIER, citizen of the United States, residing at Cheyenne, in the county of Roger Mills and State of Oklahoma, have invented certain new and useful Improvements in Spring-Traps, of which the following is a specification.

My invention relates to animal traps and particularly to that form of trap wherein a pair of jaws are actuated by a spring, the jaws being held open by a detent when the trap is set, the detent being actuated by the animal so as to release the jaws and permit them to trap the animal.

The object of my invention is the provision of a very simple and effective form of trap wherein the jaws are released by the animal coming in contact with a flexible connection, such as a cord or wire extending across the path of the animal, this flexible connection being attached to a latch which holds the jaws in their open position.

A further object of my invention is the provision of a trap having opposed jaws formed with sharp points which are designed to pierce the animal caught in the trap and kill it, thus preventing the escape of the animal.

Figure 1:
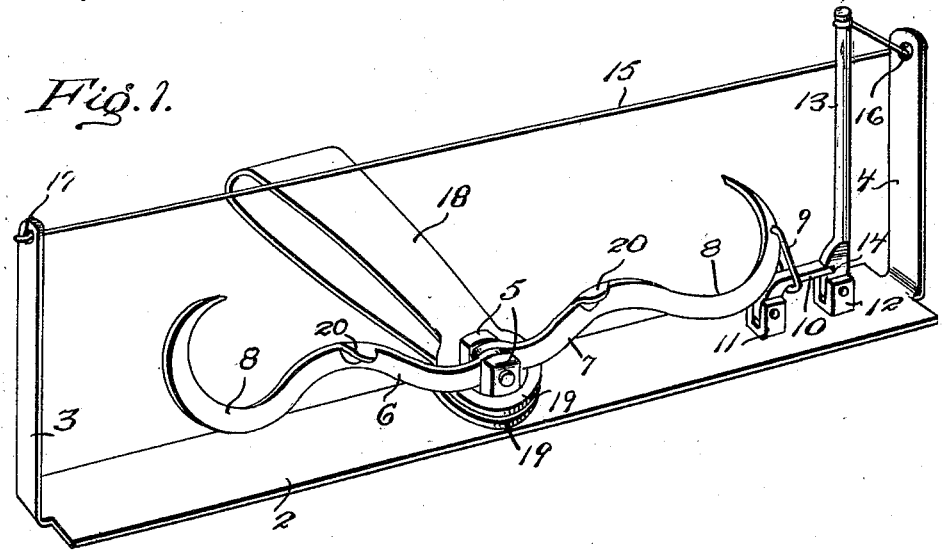
Figure 2:
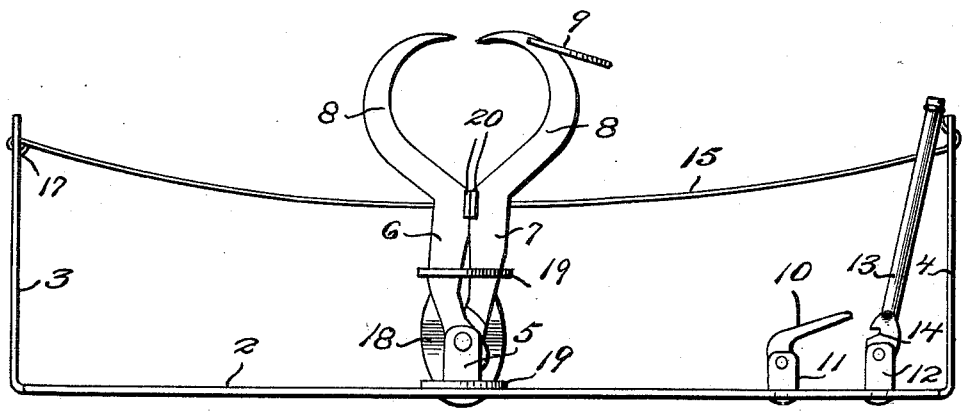

My invention is illustrated in the accompanying drawings wherein:

Figure 1 is a perspective view of my improved trap with the jaws open. Fig. 2 is a side elevation thereof with the jaws closed.

Corresponding and like parts are referred to in the following description and indicated in all the views of the accompanying drawings by the same reference characters.

In these drawings, 2 designates the base of the trap which is preferably formed of a strip of metal, sufficiently wide to provide for supporting the trap in an upright position. The ends of this strip are upwardly bent as at 3 and 4 to provide standards for the support of the tripping connection.

Extending upwardly from the base 2 are a pair of spaced ears 5 between which are pivoted the two opposed jaws 6 and 7. Each of these jaws is straight for a portion of its length and is then curved as at 8, the extremities of the jaws being sharp pointed. One of the jaws, as the jaw 7 for instance, has attached to it a loop 9 which, when the jaw 7 is spread open, depends into position to be engaged by a detent 10 which is pivoted between ears 11 carried by the base 2. Ears 12 are provided adjacent to the pins 11, between which is pivoted a latch 13 having on one side a notch 14 designed to engage the sharp end of the detent 10.

Attached to the upper end of the latch 13 is a flexible connection 15 which extends from the upper end of the latch through a perforation 16 formed in the upper end of the standard 4. The wire or flexible connection 15 then extends entirely across the trap and is attached at its other end to an eye 17 formed in the standard 3. This wire 15 is disposed at such a height that it will cross the path of any small animal. It will be understood that the standards 3 and 4 might extend upward to any desired position so as to raise the connection 15 to any height desired, to suit the animal designed to be caught.

The jaws 6 and 7 are closed by means of a spring 18 which is formed of a resilient strip of metal bent upon itself, the strip being formed at its ends with eyes 19 which engage over the ears 5. The eye forming the terminal portion of the upper arm of the spring will engage with the lower ends of the jaws 6 and 7 and tends to press these jaws inward or toward each other. Thus when the latch is released, the spring 18 will cause the arms upon the ends of the jaws to move toward each other and pierce and hold any animal which may be between the jaws. In order that the jaws may not pass each other, I preferably form the adjacent edges of the jaws with the flattened portions 20, thus providing abutments on each jaw which will contact with each other when the jaws come together.

In operation my trap is placed along a path usually taken by the animals to be trapped and the jaws are opened to the position shown in Fig. 1. The detent 10 is placed through the loop 9 and the extremity of the detent engaged with the notch 14 in the latch 13. The wire 15 or other flexible connection is fairly taut so that as an animal travels along the path it will come in contact with the wire 15 and will spring the trap. It will of course be understood that the trap is ordinarily buried in leaves or loose dirt so that it cannot be seen and that the legs of the animal act to engage with the tripping wire 15 and act to trip the trap.

I have found in practice that my trap is extremely effective for the purpose designed and that an animal caught in it is unable to get away. Inasmuch as the jaws pierce the body of the animal, the animal is killed and therefore my trap tends to eliminate the unnecessary suffering where an animal has been caught by a leg, as between the jaws of an ordinary spring trap. The invention is simple and may be very easily made and put in use.

What I claim is:

An animal trap comprising a base having upwardly extending standards at its ends, one of said standards having a perforation, oppositely disposed jaws pivoted to the middle of the base and having relatively sharp terminal ends, a loop attached to one of said jaws, a spring for forcing said jaws into closed position, a detent pivoted to the base and adapted to engage said loop, a latch pivoted to the base and having a notch adapted to engage the detent to hold it closed, and a flexible connection attached at one end to one of said standards, passing through the perforation of the other standard and attached to the latch.

In testimony whereof, I affix my signature in presence of two witnesses.

DETLEV BEGIER. [L. S.]

Witnesses:
 W. T. ROOK,
 M. E. LEWIS.

---

Copies of this patent may be obtained for five cents each, by addressing the "Commissioner of Patents, Washington, D. C."